US007084372B2

(12) United States Patent
Holverson et al.

(10) Patent No.: US 7,084,372 B2
(45) Date of Patent: *Aug. 1, 2006

(54) METHOD AND APPARATUS FOR WELDING

(75) Inventors: Todd Holverson, Appleton, WI (US);
Anthony Nikodym, Troy, OH (US);
Lin Zhang, Appleton, WI (US); Steven Barhorst, Sidney, OH (US); Jon Reynolds, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/789,093

(22) Filed: Feb. 27, 2004

(65) Prior Publication Data

US 2004/0200820 A1 Oct. 14, 2004

Related U.S. Application Data

(63) Continuation of application No. 10/112,980, filed on Mar. 29, 2002, now Pat. No. 6,723,957.

(51) Int. Cl.
*B23K 9/09* (2006.01)

(52) U.S. Cl. .......................... 219/137 PS; 219/130.51; 219/146.3

(58) Field of Classification Search .......... 219/137 PS, 219/130.51, 130.21, 130.31, 130.32, 130.33, 219/130.4, 74, 146.1, 146.22, 146.24, 146.3, 219/146.31
See application file for complete search history.

(56) References Cited

U.S. PATENT DOCUMENTS

| | | | |
|---|---|---|---|
| 3,309,490 A | 3/1967 | Cary | |
| 3,382,345 A | 5/1968 | Normando | |
| 3,585,352 A * | 6/1971 | Zvanut | 219/146.3 |
| 4,092,517 A | 5/1978 | Woodacre | |
| 5,225,660 A | 7/1993 | Mita et al. | |
| 5,349,159 A | 9/1994 | Mita et al. | |
| 5,824,992 A | 10/1998 | Nagarajan et al. | |
| 5,857,141 A | 1/1999 | Keegan et al. | |
| 5,990,445 A | 11/1999 | Ogasawara et al. | |
| 6,111,216 A * | 8/2000 | Stava | 219/130.51 |
| 6,114,657 A | 9/2000 | Hayes et al. | |
| 6,207,927 B1 | 3/2001 | Mita et al. | |

(Continued)

FOREIGN PATENT DOCUMENTS

DE 2758033 6/1979

(Continued)

OTHER PUBLICATIONS

Taylor Lyman, editor, "Metals Handbook, 8th edition, vol. 6, Welding and Brazing" 1971, pp. 202-203.*

(Continued)

*Primary Examiner*—Clifford C. Shaw
(74) *Attorney, Agent, or Firm*—George R. Corrigan

(57) ABSTRACT

A method and apparatus for MIG welding is disclosed. When in an ac mode the output is unbalanced, or the balance may be controlled. The balance may be controlled to provide a desired deposition rate and/or to obtain a desired dilution. The frequency may be any frequency, for example 30 Hz, 60 Hz, 90 Hz, or more. The weld path may have groove with angle of less than 50 degrees. A consumable, cored, wire may be used, and provide at rates of 30 or 35 pounds per hour using a single arc. In various embodiments the balance may have a negative portion of at least 1.5 times the positive portion. The process may be started using an extended negative portion, for example 0.5 or 0.75 seconds.

27 Claims, 3 Drawing Sheets

U.S. PATENT DOCUMENTS 6,723,957 B1 * 4/2004 Holverson et al. ..... 219/137 PS
2001/0047988 A1 * 12/2001 Hiraoka et al. ........ 219/137 PS

FOREIGN PATENT DOCUMENTS

| DE | 281978 A5 | 8/1990 |
|---|---|---|
| EP | 0644011 A1 | 3/1995 |
| GB | 2258958 A | 5/1993 |
| JP | S56-128673 | 3/1980 |
| JP | 55-77976 | 6/1980 |
| JP | 2892198 B2 | 5/1999 |
| JP | 11-226730 A | 8/1999 |

OTHER PUBLICATIONS

Taylor Lyman, editor, Metals Handbook, 8th edition, vol. 6, Welding and Brazing, 1971, American Society for Metals, pp. 148-151.*

Advancements in DC and AC Low Current Pulse GMAW, T. Nacey & K. Pagano, Panasonic Factory Automation, Franklin Park, IL.

Wie funktioniert es—SchweiBen mit rechteckformigem Wechselstrom, R.Killing & G. Kaulich, Solingen, derPraktiker Aug. 1996.

SENSARC PC350 EP/EN Ratio-Controllable GMA Welding Power Source Masashi OKADA, Welding Equipment Robot Dept., Welding Div.

Summet Arc 1000 Miller® The Power of Blue Feb. 1998.

Research and development of variable polarity GMAW, Practical Welding Today Jul./Aug. 1998.

Subarc Technology Breakthrough Technology Increases Saw Deposition Rates Welding Design and Fabrication Mar. 2002.

Solid Wire AC Mig welding, Welding Research International vol. 8, 1978, No. 2.

Miller VL-M4 Miller® The Power of Blue Apr. 1998.

RAD-400 And RAD-780 Miller® The Power of Blue Jun. 2001.

Metalloy X-CEL Gas-Shielded Metal-Cored Wire Information.

* cited by examiner

AC MODE

METHOD AND APPARATUS FOR WELDING

RELATED APPLICATIONS

This application is a continuation of, and claims the benefit of the filing date of, Application No. 10/112,980, filed on Mar. 29, 2002, now U.S. Pat. No. 6,723,957.

FIELD OF THE INVENTION

The present invention relates generally to the art of welding and more specifically to ac MIG welding.

BACKGROUND OF THE INVENTION

There are many known processes for welding, and each process has strengths and weaknesses. Users generally select the type of process based on characteristics of the welding job, such as speed, quality, environment, material to be welded, etc.

One well known process is submerged arc (sub arc) welding, which involves the arc being submerged beneath flux. The arc is established between a consumable electrode and the workpiece and moves along a weld path. Flux is deposited along the work path ahead of the arc and the flux (and the workpiece along the weld path) is melted by the heat of the arc. Sub arc welding is known for high deposition (a large amount of flux is melted) but not all of the flux is used, and cleaning the slag and excess flux after the weld is completed takes time and can be troublesome. Also cleaning the slag requires a wider groove, typically an angle of about 50 degrees. Sub arc welding has been used to deposit 30 pounds per hour on high current welding.

Another known process is MIG welding. MIG welding is typically performed with dc and involves a consumable electrode (wire) being fed to the arc. The arc melts the wire along the weld path. MIG welding is not as fast as sub arc welding, but does not have the excess flux to be cleaned that sub arc has. DC MIG welding has been known to deposit 17–20 pounds per hour. The arc plasma column in dc MIG may cause the arc to dig or tunnel excessively and ultimately produce lower quality welds if an attempt is made to use greater deposition rates.

DC MIG welding systems can be relatively low cost, because they can have simple power circuits. MIG welding (or GMAW), as used herein, includes an arc welding process which joins metals by heating them with an arc. The arc is between a continuously fed filler metal (consumable) electrode and the workpiece. Externally supplied gas or gas mixtures provide shielding. MIG welding often is performed by welding along a weld path that is a groove along the workpieces to be joined.

MIG has typically been performed using dc current. AC current is rarely used in part, because the ac MIG process can be difficult to maintain through a zero crossing—the current must pass through zero at the end of each half cycle, and this can cause the MIG arc to extinguish.

Some prior art systems have used an inverter for ac MIG welding, which can have very rapid zero crossings, thus helping to stabilize the arc. However, inverters can be expensive, particularly at higher currents. Such prior art systems have not been able to deposit as much material as dc MIG systems.

The composition of the wire affects the ability of the system to maintain the arc during zero crossing. The wire may be flux cored, or metal cored. Many prior art wires exacerbate the zero crossing problem in ac MIG welding.

Accordingly, a welding system that is as fast as, or faster than, a sub arc system, but does not have the drawbacks of a sub arc system, is desirable. Preferably the groove on the workpieces to be welded may be narrow, to facilitate faster and better welds. Also, a wire that is suitable for ac MIG welding is desirable.

SUMMARY OF THE PRESENT INVENTION

According to a first aspect of the invention a method of MIG welding includes providing ac power to a weld. The ac power has negative and positive portions. The negative portion is greater than the positive portion, and the frequency of output is at least 30 or 60 Hz.

According to a second aspect of the invention a method of MIG welding includes providing ac power to a weld following a weld path that includes a groove having an angle of less than 50 degrees.

According to a third aspect of the invention a method of MIG welding includes providing ac power to a weld and providing a consumable, cored, wire to the weld.

According to a fourth aspect of the invention a method of MIG welding includes providing ac power to a weld, and providing a consumable wire to the weld at a rate of at least 30 or 35 pounds per hour using a single arc.

According to a fifth aspect of the invention a method of MIG welding includes providing ac power to a weld wherein the negative portion is at least 1.5 times the positive portion.

According to a sixth aspect of the invention a method of MIG welding includes providing ac power to a weld. The negative portion is greater than the positive portion and weld process begins with a negative portion of at least 0.5 seconds duration.

According to a seventh aspect of the invention an apparatus for MIG welding a substrate of low carbon steel having a thickness less than ¼" comprises a table for holding the substrate and a MIG gun moved over the substrate by a carriage, depositing wire at a rate of at least 30 pounds per hour while the MIG gun is welding. A source of shielding gas provides shielding gas to the MIG gun and a power source provides a substantially square AC current at the MIG gun, with the average current being at least 300 amps.

According to an eighth aspect of the invention a system of MIG welding includes an ac power source that has a MIG output and a controller that controls the power source. A feedback circuit is between the power source and the controller. A source of consumable wire provides wire to the MIG output. The controller provides that the negative portion is greater than the positive portion, and that the output frequency is at least 60 Hz.

According to a ninth aspect of the invention a system of MIG welding includes a MIG torch, an ac power source that provides ac power to the MIG torch and a source of consumable wire that provides wire to the MIG torch. The wire is made of a sheath encapsulating a core comprised of up to 5% by weight, or 0.3% to 5% by weight, graphite and one or more compounds of potassium.

According to a tenth aspect of the invention a system of MIG welding includes an ac power source having a control input and a MIG output. A controller has a balance circuit and a feedback circuit, and controls the power source such that the negative portion is at least 1.5 times the positive portion.

The unbalance can be the result of duration, current, amp-seconds, or other parameters.

The frequency is between 90 Hz and 120 Hz in other embodiments.

A consumable, flux-cored, metal cored, or non-cored wire is provided to the weld in various alternatives. The metal cored wire can be a sheath encapsulating a core, and the core is a combination of graphite and one or more compounds of potassium, and the combination does not exceed approximately 5% by weight, or is between 0.3% and 5% in other embodiments. The compound of potassium is $K_2MnTiO_4$ in another embodiment.

The weld is performed on a workpiece having a groove having an angle of less than 50 degrees, 20–30 degrees, or less than 30 degrees in a number of embodiments.

The process is performed to deposit wire at a rate of at least 35 pounds per hour using a single arc, or at least 40 pounds per hour in other embodiments.

The negative portion is 1.5 times, or twice, the positive portion in various embodiments.

The process is initiated with a negative having a duration of at least 0.5 seconds, or at least 0.75 seconds in other alternatives.

The process is preformed with a stick-out of about 2 inches, and using a shielding gas at a rate of at least 80 cubic feet per hour. In other embodiments.

According to another aspect of the invention the dilution of MIG welding process is controlled by using ac power and controlling the balance to obtain a desired dilution. The balance may be greater EP or greater EN.

Other principal features and advantages of the invention will become apparent to those skilled in the art upon review of the following drawings, the detailed description and the appended claims.

Figure 1:
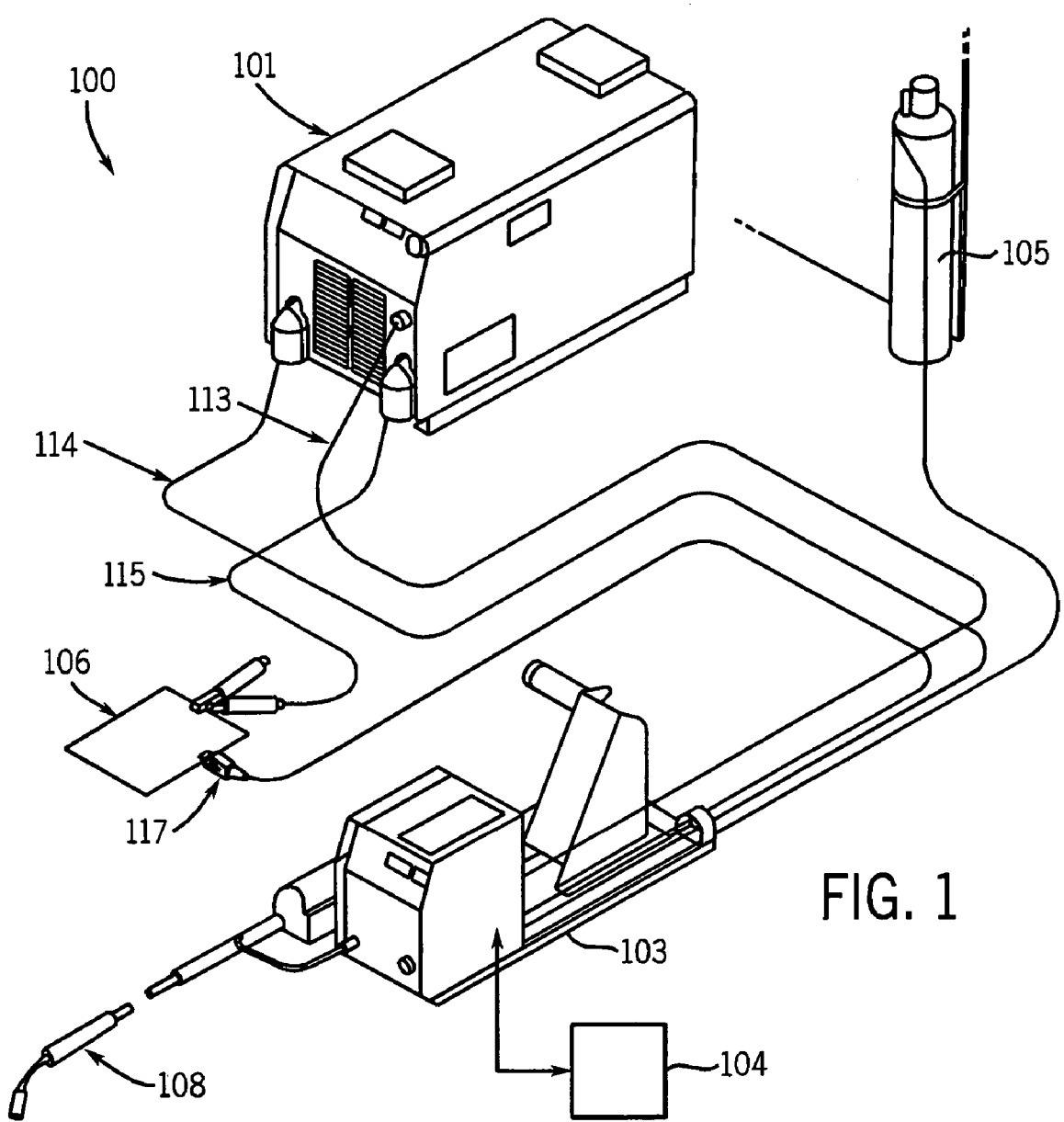
FIG. 1 is diagram of a welding system in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular system, wire, and method, it should be understood at the outset that the invention may be implemented with other systems, components, methods, and wire.

Generally, the present invention is a method and apparatus for ac MIG welding that allows for high deposition rates. Various embodiments provide for 35, 40, or more pounds of wire per hour being deposited. This very high speed, ac MIG welding may be as fast or faster than sub arc welding, but has the advantages of MIG welding as well, and does not require flux to be poured into the weld path.

The ac waveform in the preferred embodiment allows the process to proceed at a very fast rate, and includes an unbalanced waveform, with more negative than positive, such as greater negative time or greater EN amps-seconds. The negative portion, is at least twice the positive portion, or at least 1.5 times the positive portion in various embodiments. The greater negative time and/or amp-seconds increases speed because the consumable wire is being heated during the time. The use of EN also reduces the strong arc plasma column, thus reducing the likelihood of excessive digging or tunneling.

The waveform includes, in one embodiment, an extended time of electrode negative for helping start the process, for example at least 0.5, or 0.75 seconds.

Preferably the process is performed using a robust but relatively inexpensive power supply, such as a Miller Summit Arc® welding power supply, which has a cycloconverter topology. The Summit Arc® welding power supply is adapted to provide the desired unbalanced waveform. Various embodiments provide that the frequency is at least 60 Hz, or between 90 Hz and 120 Hz.

The wire is chosen to reduce the tendency of the arc to extinguish at zero crossings, and may be solid wire, flux-cored, or metal-cored. The metal cored wire is preferred, and in one embodiment is comprised of a combination of graphite and compounds of potassium, such as $K_2MnTiO_4$, which when combined do not exceeding 5% by weight.

The system and wire provide that the weld path may have a relatively narrow groove in the preferred embodiment, such as an angle of less than 50 degrees in one embodiment, and an angle of less than 30 degrees, or an angle of between 20 degrees and 30 degrees in other embodiments.

The above-described features are used alone or in various combinations in the present invention. Specific embodiments will be described below.

Referring now to FIG. 1, a system for welding 100 in accordance with the present invention includes a power source 101, a wire feeder drive 103, a wire feeder controller 104, and a source of gas 105 which cooperate to provide welding power to a torch 108, for welding a workpiece 106. In many applications, particularly for high deposition applications, workpiece 106 is much larger than shown.

Power is provided from power source 101 (such as a modified Miller Summit Arc® welding power supply), and power source 101 includes internal control circuitry in the preferred embodiment. Power source, or source of power, as used herein, includes the power circuitry such as rectifiers, switches, transformers, SCRs, etc that control, process and provide the output power.

The power is provided as a MIG output on cables 114 and 115 to workpiece 106 and wire feeder 103 (such as a Miller RAD 400® feeder drive used with a Miller VL-M4® controller) or power is provided directly to the torch. MIG output, as used herein, includes an output having sufficient power for use in a MIG process (it may require transformation before being used in the MIG process). In the preferred embodiment wire feed controller 104 provides control signals to (and may receive feedback signals from) wire feeder 103. In an alternative-embodiment control signals may be provided between power source 101 and wire feeder 103 on cable 113.

Voltage feedback may be provided from clamp 117. Current feedback may be obtained from a feedback circuit, such as a shunt and associated circuiting within power source 101 or wire feeder 103. Feedback circuit, as used herein, includes a circuit that provides a signal indicative of or responsive to an output or intermediate signal, which is provided to the controller and control decisions are made in response thereto.

The controller(s) for the system may reside in power source 101, wire feeder 103, both, external to both, or a combination thereof, as shown in FIG. 1. The system shown may be housed in a single housing, or in a number of housings other than as shown. The controller in power supply 101 and controller 104 have control outputs that are connected to a control input on the power circuit and wire feeder 103, respectively.

Controller, as used herein, includes digital and analog circuitry, discrete or integrated circuitry, microprocessors, DSPs, etc., and software, hardware and firmware, located on one or more boards, used to control a device such as a power supply. Circuit, as used herein, includes analog and/or digital components, a microprocessor (with or without software), and/or DSPs or a portion thereof. Control input, as used herein, includes an input received that controls a power supply or other component, such as a setpoint, gate signals, phase control signals, etc. Control output, as used herein, includes an output provided that is used to control a power supply or other component, such as a setpoint, gate signals, phase control signals, etc.

Figure 2:
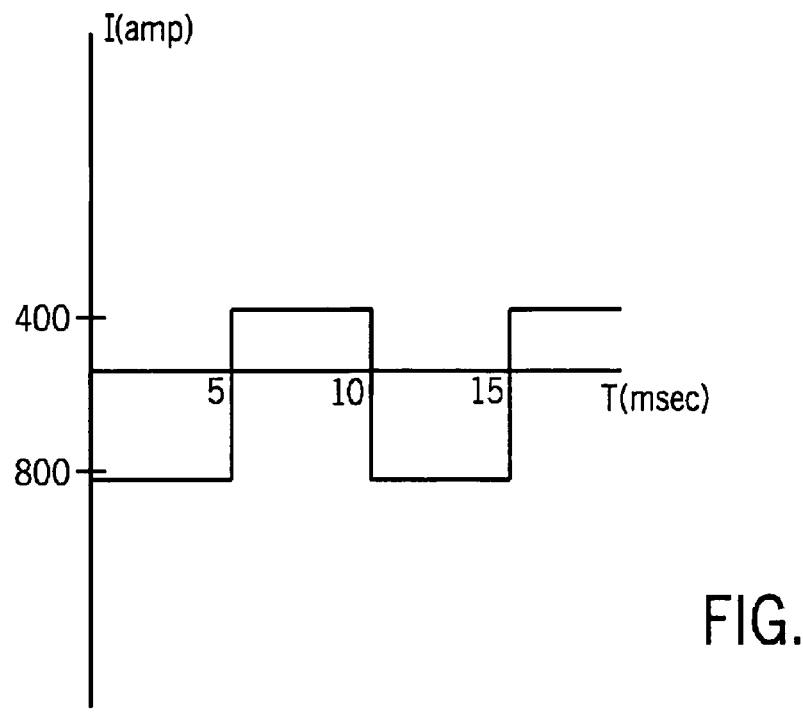
FIG. 2 is MIG output current waveform in accordance with the present invention.

Referring now to FIG. 2, the present invention contemplates an ac output that is unbalanced, with greater electrode negative (EN) portion than electrode positive (EP) portion. Greater EN portion than EP portion, as used herein, means that the magnitude of one or more waveform parameters, such as time duration, amp-seconds, energy, etc, or combinations thereof, is greater for the EN portion than for the EP portion. Ac output, as used herein, includes an output that alternates polarity, that may or may not have a non-zero average (i.e., it may be balanced or unbalanced).

The inventors have learned that the increased EN portion allows the deposition rate to be increased, at least in part because the wire melting is increased during the EN portion. Also, controlling the balance allows the penetration or dilution (relative mixing of wire and base metals) to be controlled. The waveform of FIG. 2 is a 90 Hz output, with equal duration EP and EN, 450 amps EP, and 850 amps EN. The output is a square wave and alternatives include substantially square waves or sloped transitions. Because of the different EP and EN current, the negative portion is greater than the positive portion. The waveform was used to weld 380 IPM, using 3/32 inch metal cored wire, at an average voltage of 38 volts, to deposit 42 pounds per hour. One alternative provides a greater EN duration. Positive or negative duration, as used herein, refers to the time duration of the positive or negative portion of an ac waveform.

The balance can be adjusted to optimize speed and stability for a particular application, or it can be preset. Various embodiments provide for the balance to be preset to 2-1 or 1.5-1, with the greater EN than EP. The 2:1 ratio provides a desirable dilution for some applications. Other applications may use a different ratio, including greater EP than EN, to obtain a desirable dilution. Balance, as used herein, refers to the time, magnitude or other parameter of the positive portion of the waveform, relative to the negative portion of waveform.

The waveform in various embodiments is unbalanced using parameters such as amp-seconds, current, or time. Amp-seconds, as used herein, is the integral of the amperage waveform over time, or an average amperage multiplied by time. Positive or negative amp-seconds, as used herein, refers to the amp-seconds of the positive or negative portion of an ac waveform.

Figure 3:
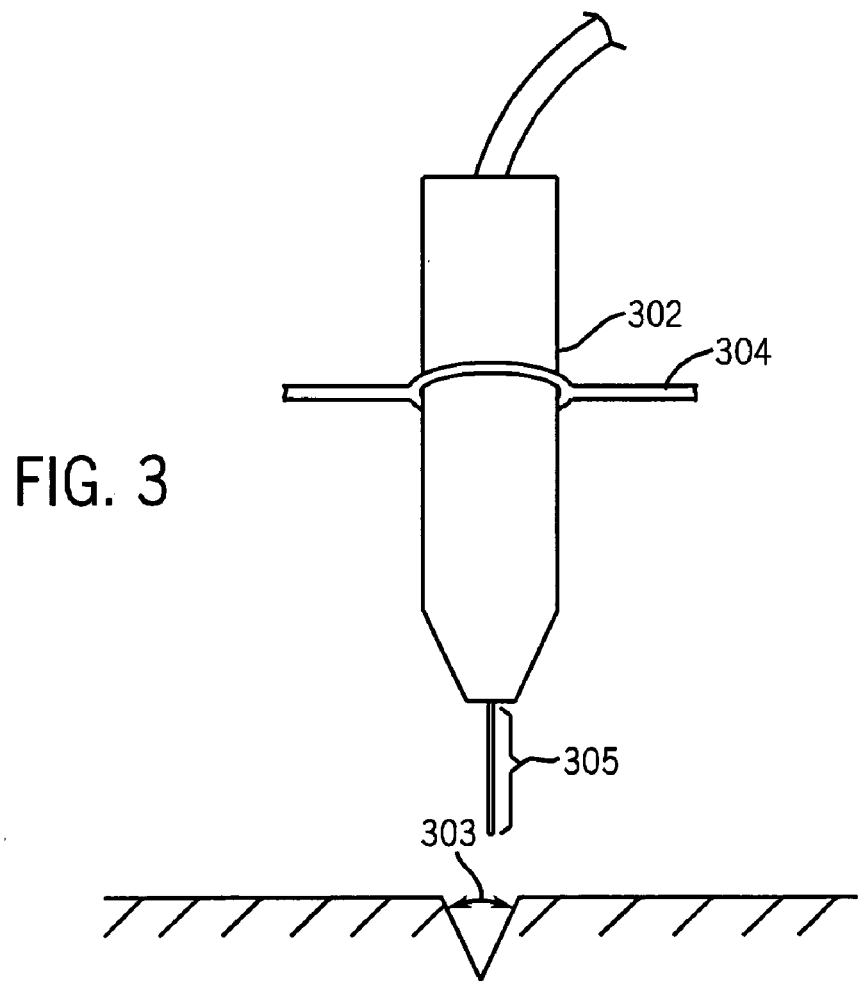
FIG. 3 is a MIG torch over a cross section of a workpiece.

The present invention allows MIG welding to be performed on a workpiece with a relatively narrow groove. This aids the increase in speed of the present invention. FIG. 3 shows a cross section of a workpiece 301 and a MIG torch 302 disposed above workpiece 301. Workpiece, as used herein, includes one or more pieces to be welded. The angle of the groove is the angle measured from one side of the groove to the other side, such as angle 303. Any angle may be used with the invention, but in the preferred embodiment an angle of less than 50 degrees is used. Other embodiments provide for an angle of less than 30 degrees, or between 20 and 30 degrees.

In one embodiment the process is automated, and torch 302 is mounted on a carriage 304 so that it is near the weld path. Relative movement between torch 301 and the weld path is provided to automate the process. Carriage, as used herein, includes a mechanism to move a torch relative to a workpiece, either by moving the torch, or by moving the workpiece. The process performed on steel ½ inch or thicker at 300 amps to deposit 30 pounds or more per hour.

Another aspect of the invention is the use of a consumable wire that enhances stability at zero crossing. Consumable wire, as used herein, includes a wire that is consumed during the welding process and thus forms, in part, the resultant product. The present invention contemplates solid, flux cored, or metal cored wire. Flux-cored, as used herein, includes a wire that is more than five percent non-metallic. Metal-cored wire, as used herein, includes wire that is no more than five percent non-metallic.

The wire of preferred embodiment is derived from the composition of METALLOY-X-CEL® wire, available from the assignee of this invention. It is preferably used with a recommended shielding gas comprising Ar, $CO_2$, or a mixture thereof. The preferred combination of the mixture of Ar and $CO_2$ comprises a minimum of 75% and a maximum of 95% of Ar.

The typical undiluted weld metal chemistry of such wire is shown in Table 1 for two gas mixtures, but other compositions and mixtures may also be used.

TABLE 1

|  | C | Mn | Si | P | S |
|---|---|---|---|---|---|
| 75% Ar/25% $CO_2$ | 0.06 | 1.28 | 0.65 | 0.011 | 0.011 |
| 90% AR/10% $CO_2$ | 0.06 | 1.35 | 0.70 | 0.011 | 0.010 |

The wire of the preferred embodiment comprises a sheath encapsulating a core of the wire. The core is usually made of a compacted powder of a preselected chemical composition. The core composition comprises a combination of graphite and one or more compounds of potassium, either homogeneously or heterogeneously in the form of clusters, strands or other suitable configuration. The total percentage of the combination of graphite and potassium compound(s) does not exceed approximately 5% by weight, with the preferred total percentage of graphite and potassium compound(s) selected from the range of about 0.3% to about 5.0%.

The addition of the combination of graphite and one or more compounds of potassium provides arc stability in an ac process. In particular, the addition of the preferred potassium compound, such as potassium manganese titanate ($K_2MnTiO_4$) has contributed to the described effect of stabilizing the arc particularly advantageously. One alternative provides that potassium sulfate ($K_2SO_4$) be used as the potassium compound.

The wire is manufactured in accordance with known techniques, such as forming a U-shaped sheath and filling it with the core composition. The wire then travels through the closing dies which close it into a tubular form, causing the sheath to encapsulate the core and forming a metal-cored wire with a seam. The core composition usually comprises powdered ingredients that are fed into the sheath. The powder is later stamped or compacted when the closed wire is fed through the drawing dies to reduce the wire's diameter to the final size and compress the core.

In accordance with the preferred embodiment, the welding process is performed using a relatively long stick-out (see 305, FIG. 3), such as on the order of 2 inches. The process is particularly useful for welding on low carbon steel, or stainless steel, but is useful for welding other materials also.

Figure 4:
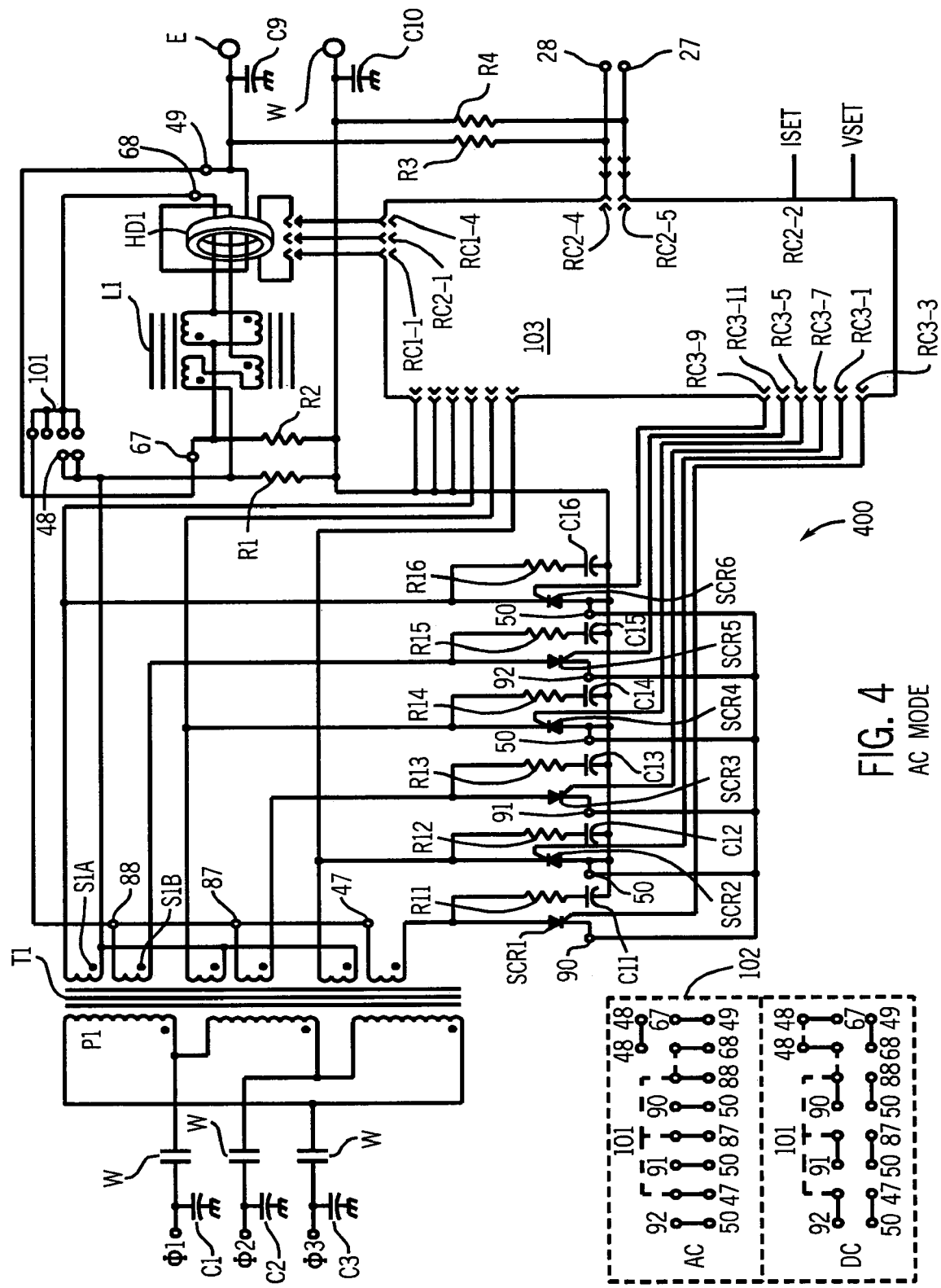
FIG. 4 is a circuit diagram of a part of a power source in accordance with the present invention.

A diagram of a power circuit 400 used in power supply 101 is shown in FIG. 4. The circuit is very similar to that described in U.S. Pat. No. 6,114,655, also invented by one of the inventors of this invention, and owned by the assignee of this invention. The Miller Summit Arc® welding power supply is a commercial embodiment of U.S. Pat. No. 6,114,655.

The power circuit will be described in detail with respect to the novel aspects of the circuit, and a more complete description of the pre-existing portions of the circuit may be seen in U.S. Pat. No. 6,114,655.

FIG. 4 is a simplified circuit diagram showing a power supply connected in an AC mode. As described in the prior art, it may be connected in other modes as well. Power circuit 400 is controlled by firing a plurality of SCRs 1–6 in such a way as to control the output frequency. Specifically, when the SCR's are fired in a sequence of SCR6, SCR3, SCR2 SCR5, SCR4, SCR1, each SCR conducts for at most 120 degrees before the zero crossing, and an output signal having a frequency of 1.5 times the input line frequency is created. Thus for a 50 or 60 Hz input a 75 or 90 Hz output is provided. Such a circuit is called a step-up cycloconverter. Step-up cycloconverter, as used herein, is a cycloconverter having an output frequency greater than the input frequency.

Other firing orders will result in other output frequencies. For example, firing two negative conducting SCRs followed by 1 positive conducting SCR will result in a 60 Hz waveform that has an EN duration twice the EP duration. Alternatives provide for lesser frequencies, or greater frequencies, including those obtained using an inverter.

The output is provided through center tap inductor L1 so that the current is always flowing in the same flux creating direction in L1, regardless of the direction of the output current flow, inductor. L1 smooths the welding current and assists in a rapid zero crossing. However, the inductor is configured such that the number of turns provide a desired unbalanced waveform. There are twice the number of turns for EP (the positive portion), as for EN (the negative portion). Thus the EN current will be twice that of the EP Current, (because ampere-turns are the same for both polarities). This is different than the prior art circuit, and is easily accomplished by changing a parallel connection to a series connection.

A hall device HD1 is part of a feedback circuit, used by the controller to control the current output. Hall device HD1 and inductor L1 are part of a balance circuit because they are used to control the balance (2:1 in the preferred embodiment). Specifically, the conductor which carries the current for the positive portion (EP) through inductor L1 is wound through hall device HD1 twice. This effectively scales the feedback signal up by a factor of 2, causing the output to be half that of the EN portion for a given setpoint. Balance circuit, as used herein, includes a circuit that adjusts or controls the balance of an ac output so that it is unbalanced.

Numerous modifications may be made to the present invention which still fall within the intended scope hereof. Thus, it should be apparent that there has been provided in accordance with the present invention a method and apparatus for a method and system for ac MIG welding that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method of MIG welding comprising:
   providing ac power to a weld, wherein the ac power has a negative portion and a positive portion, and the ac power further has a frequency;
   wherein the negative portion is greater than the positive portion;
   wherein the frequency is at least 60 Hz; and
   providing a consumable, metal-cored, wire to the weld the wire includes providing a wire wherein the wire comprises a sheath encapsulating a core having a core composition, the core composition comprising a combination of graphite and one or more compounds of potassium, the combination of graphite and compounds of potassium in the core composition not exceeding approximately 5% by weight.

2. The method of claim 1, wherein the frequency is between 90 Hz and 120 Hz.

3. The method of claim 1, wherein providing the wire includes providing the wire electrode wherein the one or more compounds of potassium comprise $K_2MnTiO_4$.

4. The method of claim 3, wherein providing includes providing the wire wherein the combination is selected from the range from about 0.3% to about 5.0% by weight.

5. The method of claim 1, further comprising providing a weld path on at least one workpiece, wherein the weld path includes a groove having an angle of less than 30 degrees.

6. The method of claim 1, further comprising providing a weld path on at least one workpiece, wherein the weld path includes a groove having an angle of between 20 degrees and 30 degrees.

7. The method of claim 6 wherein the negative portion is at least 1.5 times the positive portion.

8. The method of claim 7 wherein the weld process begins with a first negative portion having a duration of at least 0.75 seconds.

9. The method of claim 1, including welding at a rate of at least 35 pounds per hour using a single arc.

10. The method of claim 9 including welding at a rate of at least 40 pounds per hour.

11. The method of claim 9 wherein the negative portion is at least twice the positive portion.

12. The method of claim 1 wherein the weld process begins with a first negative portion having a duration of at least 0.5 seconds.

13. The method of claim 1 further including providing a stick-out of about 2 inches.

14. The method of claim 13 further comprising providing a shielding gas at a rate of at least 80 cubic feet per hour.

15. The method of claim 1, further comprising providing a weld path on at least one workpiece, wherein the weld path includes a groove having an angle of less than 50 degrees.

16. A MIG welding system comprising:
power means for providing ac power to a weld, wherein the ac power has a negative portion and a positive portion, and the ac power further has a frequency; and
control means for controlling the power means, wherein the negative portion has a negative amp-seconds and the positive portion has a positive amp-seconds, wherein the control means causes the negative amp-seconds to be greater than the positive amp-seconds, and wherein the frequency is at least 60 Hz, and wherein the weld process begins with the negative portion of at least 0.5 seconds duration; and
a source of wire comprising a sheath encapsulating a core having a core composition, the core composition comprising a combination of graphite and one or more compounds of potassium, the combination of graphite and compounds of potassium in the core composition not exceeding approximately 5% by weight.

17. The system of claim 16, wherein the control means includes means for providing the frequency to be between 90 Hz and 120 Hz.

18. The system of claim 16, further including a consumable, flux-cored, wire, disposed to be provided to the weld.

19. The system of claim 18, wherein the wire is metal-cored.

20. The system of claim 19, further comprising a weld path on at least one work piece, wherein the weld path includes a groove having an angle of less than 50 degrees.

21. The system of claim 16, further comprising a weld path on at least one workpiece, wherein the weld path includes a groove having an angle of less than 30 degrees.

22. The system of claim 21 wherein the control means for includes means for causing the negative amp-seconds to be at least twice the positive amp-seconds.

23. The system of claim 16 wherein the control means includes means for causing the negative amp-seconds to be at least 1.5 times the positive amp-seconds.

24. The system of claim 16 wherein the control means includes means for causing the weld process to begin with a first cycle portion having a duration of at least 0.75 seconds.

25. A method of controlling dilution in MIG welding comprising:
providing ac power to a weld, wherein the ac power has a negative portion and a positive portion, and the ac power further has a frequency;
controlling the balance of the negative portion and the positive portion to obtain a desired dilution.

26. The method of claim 25 wherein the negative portion is greater than the positive portion.

27. The method of claim 25 wherein the negative portion is less than the positive portion.

* * * * *